United States Patent Office 3,770,814
Patented Nov. 6, 1973

3,770,814
SALICYLIC ACID AND HALO-SUBSTITUTED
SALICYLIC ACID SALTS OF OXYDIANILINE
Theodore E. Majewski, Midland, and James P. Easterly, Bay City, Mich., assignors to The Dow Chemical Company, Midland, Mich.
No Drawing. Original application May 3, 1968, Ser. No. 726,537, now Patent No. 3,689,536. Divided and this application Feb. 22, 1972, Ser. No. 228,358
Int. Cl. C07c 93/00
U.S. Cl. 260—501.18
4 Claims

ABSTRACT OF THE DISCLOSURE

Compounds of the formula

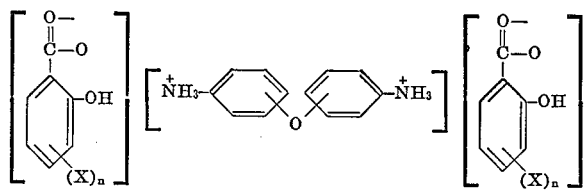

in which X is H, Br, or Cl; and $n$ is 0, 1, or 2.

The compounds are useful as fungicides, insecticides, herbicides, and the like.

---

This is a division of application, Ser. No. 726,537 filed May 3, 1968, now U.S. Pat. No. 3,689,536.

The present invention relates to oxydianiline salts of salicyclic acid and certain halogenated salicyclic acids.

The reaction by which the compounds of this invention are prepared is the simple neutralization reaction between the carboxyl groups of salicylic acid or halogenated salicylic acid and the amino groups of oxydianiline. The reaction is preferably conducted in an inert organic solvent, which is a solvent for both of the reactants. It may be necessary to heat the reaction mixture in order to solubilize either one or both of the reactants. The reactants and the inert solvent are merely mixed together with stirring and heating until solution has been achieved, and heating and stirring are continued for a period of time to insure substantially complete reaction. The temperature used can vary widely from about room temperature to about 200° C. Solvents which permit the use of reaction temperatures in the range of 100° C. to about 150° C. are preferred.

The reaction solvent is necessarily one which is unreactive with either of the reactants and is preferably one in which both reactants have substantial solubility. Aromatic and aliphatic hydrocarbon solvents and halogenated hydrocarbon solvents are preferred in the preparation of novel compounds of this invention. Chlorobenzene and dichlorobenzene are particularly preferred reaction solvents.

The starting reactants in the production of the compounds of this invention are salicylic acid, chlorinated- or brominated-salicylic acids, and oxydianiline. The substituted salicylic acids which can be used as starting reactants are those having one or two chloro or bromo substituents.

The preferred salicylic acid compounds are salicylic acid, 3,5-dibromosalicylic acid, 3,5-dichlorosalicylic acid, 5-chlorosalicylic acid, and 5-bromosalicylic acid. Oxydianilines such as 2,2'-oxydianiline, 3,3'-oxydianiline, and 4,4'-oxydianiline can be employed as the oxydianiline reactant. The preferred reactant is 4,4'-oxydianiline.

The oxydianiline used is preferably of high purity. The purification of dianilines is disclosed in U.S. Pats. 3,175,007 to Berhenke and 3,251,880 to Gentry. Oxydianilines purified by the processes described in either of these patents are satisfactory for use in the production of the compounds in this invention.

The novel salicylic acid salts of oxydianiline of this invention find utility as fungicides, herbicides, and insecticides. For instance, the salt of 3,5-dibromosalicylic acid and 4,4'-oxydianiline is effective in the prevention of rice blast and lettuce downy mildew when applied to plants as an aqueous dispersion of 100 p.p.m. concentration. The salicylic acid salt of 4,4'-oxydianiline finds utility as a preemergent herbicide to control barn yard grass and rice when applied to the soil in amounts of about 10 pounds per acre. The salt of 5-chlorosalicylic acid and 4,4'-oxydianiline is effective as a contact insecticide against plum curculio when applied in a spray or dust in 0.1 percent concentration or less. The 5-bromosalicylic acid salt of 4,4'-oxydianiline is similarly effective against the American cockroach. This compound also prevents tomato late blight when applied to the plants as an aqueous dispersion in concentrations of 100 p.p.m. or more.

The invention may be more fully understood by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the preparation of the salt of 4,4'-oxydianiline and 5-chlorosalicylic acid.

Purified 4,4'-oxydianiline (0.05 mole, 10 g.), 5-chlorosalicylic acid (0.10 mole, 17.2 g.), and 250 ml. of chlorobenzene were charged into a 500 ml. 3 neck round bottom flask equipped with a motor stirrer and reflux condenser. The reaction mixture was heated to 120° C., at which temperature solution was attained. The solution was maintained, with stirring, for about 1 hour. The resulting purple solid was collected on a Büchner funnel using toluene as an aid in transferring, and then the solid was washed with Skelly B solvent.

The salt weighed 27.5 g. and its M.P. was 150–154° C. (uncorrected). The material was dried in an electric oven for 24 hours in an effort to improve its quality.

The M.P. was improved to 153–155° C. (uncorrected). The results of elemental analysis were:

| Percent | Found | Theory |
|---|---|---|
| Carbon | 57.6 | 7.26 |
| Hydorgen | 4.08 | 4.07 |
| Nitrogen | 5.02 | 5.14 |

EXAMPLE 2

This example illustrates the preparation of the salt of 4,4'-oxydianiline and 5-bromosalicylic acid.

The procedure was identical to that of Example 1 with the exception that 5-bromosalicylic acid (21.7 g., 0.10 mole) was used as a substitute for 5-chlorosalicylic acid of Example 1 and 350 ml. of chlorobenzene was used as a solvent.

A total of 29 g. of a grey powder, melting at 157–158° C. (uncorrected), was obtained. This material was identified by elemental analysis as the expected salt.

EXAMPLE 3

This example illustrates the preparation of the salt of 4,4'-oxydianiline and 3,5-dibromosalicylic acid.

A 1 liter, 3 neck round bottom flask equipped with a motor stirrer, a reflux condenser, and a heater was charged with 10 g. (0.05 mole) of 4,4'-oxydianiline and 29.1 g. (0.10 mole) of 3,5-dibromosalicylic acid and 500 ml. of o-dichlorobenzene. The reaction mixture was heated with stirring at 150° C. for about 1 hour. The contents were then allowed to cool at room temperature with continued stirring. The resulting solid was collected on a Büchner funnel, washed with Skelly B solvent (60–100° C.), and dried in an electric oven at 80° C.

A grey powder weighing 36 g. melted with decomposition at 207–208° C. (uncorrected). Elemental analysis was as follows:

| Percent | Found | Theory |
|---|---|---|
| Carbon | 39.5 | 39.43 |
| Hydrogen | 2.29 | 2.55 |
| Nitrogen | 3.72 | 3.54 |
| Bromine | 39.85 | 40.39 |

EXAMPLE 4

This example illustrates the preparation of the salt of 4,4'-oxydianiline and salicylic acid.

Following the general procedure of Examples 1–3, salicylic acid and 4,4'-oxydianiline are reacted to obtain the expected salt. In a representative preparation, the reaction mixture was filtered and the collected product was washed with toluene and dried at 65° C. to obtain a violet powder, M.P. 99–101° C. (uncorrected). It was identified by elemental analysis as the expected disalicylate of 4,4'-oxydianiline as follows:

| Percent | Found | Theory |
|---|---|---|
| Carbon | 65.4 | 65.54 |
| Hydrogen | 5.5 | 5.08 |
| Nitrogen | 5.97 | 5.88 |

By the procedure described in the above examples there can be prepared the salts of the isomeric oxydianilines (e.g., 2,2'-oxydianiline, 3,3'-oxydianiline, and 4,4'-oxydianiline) with other halogenated salicylic acids (e.g., 4-bromosalicylic acid, 6-chlorosalicylic acid, 3-bromo-5-chlorosalicylic acid, and 4,6-dichlorosalicylic acid). These salts have properties similar to those of the closely related salts of the above examples.

Although the invention has been illustrated in considerable detail with reference to certain preferred embodiments, it will be understood that variations and modifications can be effected within the spirit and scope of the invention as described above and as defined in the appended claims.

What is claimed is:

1. A compound selected from the group consisting of

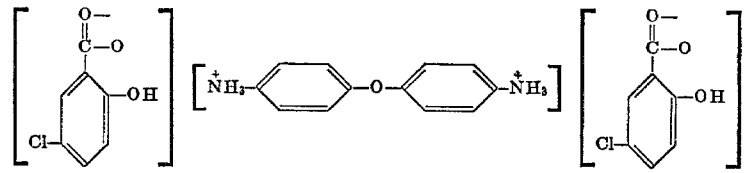

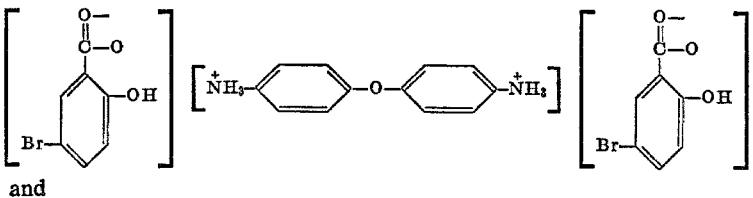

and

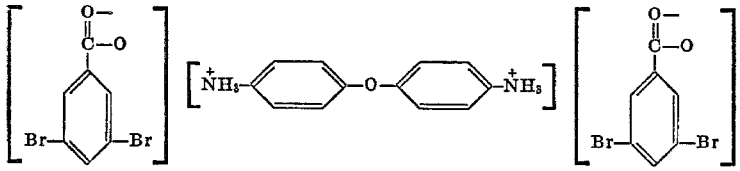

2. The compound of claim 1 having the formula

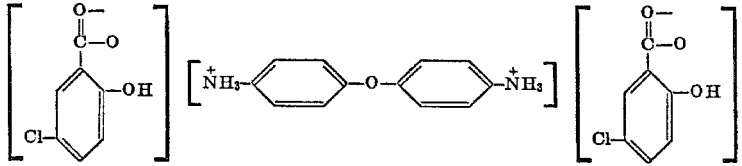

3. The compound of claim 1 having the formula
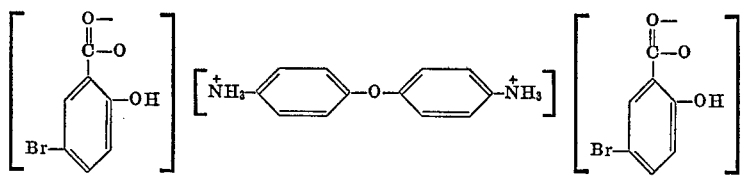
4. The compound of claim 1 having the formula
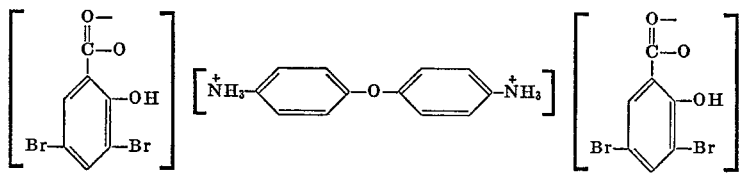
References Cited
UNITED STATES PATENTS
3,682,968  8/1972  Shen et al. _____ 260—501.17 X
LEON ZITVER, Primary Examiner
M. W. GLYNN, Assistant Examiner